United States Patent
Zutt et al.

(10) Patent No.: US 6,851,659 B2
(45) Date of Patent: Feb. 8, 2005

(54) VALVE SEATING SYSTEM

(75) Inventors: Ulrich Zutt, Niedernhausen (DE); Thomas Schuster, Niedernhausen (DE); Marcus Forche, Frankfurt (DE); Christoph Voss, Frankfurt am Main (DE); Frank Holl, Marienhausen (DE); Andreas Richter, Neu-Anspach (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 97 days.

(21) Appl. No.: 10/399,421

(22) PCT Filed: Oct. 9, 2001

(86) PCT No.: PCT/EP01/11666
§ 371 (c)(1),
(2), (4) Date: Apr. 17, 2003

(87) PCT Pub. No.: WO02/35125
PCT Pub. Date: May 2, 2002

(65) Prior Publication Data
US 2004/0021537 A1 Feb. 5, 2004

(30) Foreign Application Priority Data

Oct. 20, 2000 (DE) .......................................... 100 51 948
Jan. 20, 2001 (DE) .......................................... 101 02 593

(51) Int. Cl.[7] ............................................. F16K 31/02
(52) U.S. Cl. ................ 251/359; 137/15.17; 137/315.27
(58) Field of Search ................................. 251/359, 365; 137/15.17, 15.18, 315.01, 315.03, 315.27; 29/888.44, 888.41, 509, 840.122, 840.124

(56) References Cited

U.S. PATENT DOCUMENTS

| 5,333,836 | A | | 8/1994 | Fukuyo et al. |
| 6,084,493 | A | | 7/2000 | Siegel |
| 6,637,724 | B1 | * | 10/2003 | Mayer .................... 251/129.15 |
| 6,644,623 | B1 | * | 11/2003 | Voss et al. ............. 251/129.15 |

FOREIGN PATENT DOCUMENTS

| DE | 4221988 | 1/1994 |
| DE | 4306220 | 9/1994 |
| DE | 19922334 | 9/2000 |
| DE | 19948425 | 11/2000 |
| DE | 19936711 | 1/2001 |
| DE | 19951665 | 5/2001 |

* cited by examiner

Primary Examiner—Edward K. Look
Assistant Examiner—John K. Fristoe, Jr.
(74) Attorney, Agent, or Firm—Honigman Miller Schwartz and Cohn LLP

(57) ABSTRACT

The present invention relates to a closure device, in particular for closing ducts in a valve-accommodating member in which pressure medium is conveyed, comprising a rotationally symmetric closure member that is wedged in an accommodating bore of a housing. The calked joint is configured as a calking cone so that the accommodating bore forms a funnel-shaped contraction in the direction of the closure member, said contraction covering the periphery of the closure member in the area of a collar, and succeeding the calking cone is a second housing step that is expanded in relation to the first housing step, said step being formed by the housing material deforming plastically to the funnel-shaped contraction of the accommodating bore.

10 Claims, 5 Drawing Sheets

VALVE SEATING SYSTEM

TECHNICAL FIELD

The present invention generally relates to valve seats and more particularly relates to vehicle seats used.

BACKGROUND OF THE INVENTION

DE 42 21 988 A1 discloses a closure device including a valve housing press-fitted into the accommodating bore of a valve carrier. In this arrangement, the valve housing performs the function of a calking punch so that it must be manufactured in an accordingly solid manner and extremely precisely with regard to its surface contour in order to transmit the high press-in force that acts on the valve carrier, on the one hand, and to ensure the desired seal-tightness after the calking operation in the accommodating bore has been terminated, on the other hand.

Therefore, an object of the present invention is to improve upon a closure device of the type referred to hereinabove to the end of avoiding the mentioned disadvantages, with a view to permitting the attachment of a closure member of a simplest possible design in the accommodating bore in a housing by means of a comparatively simple and yet safe, fluid-tight calking operation.

DETAILED DESCRIPTION OF THE PREFERRED EMBODIMENTS

Figure 1:
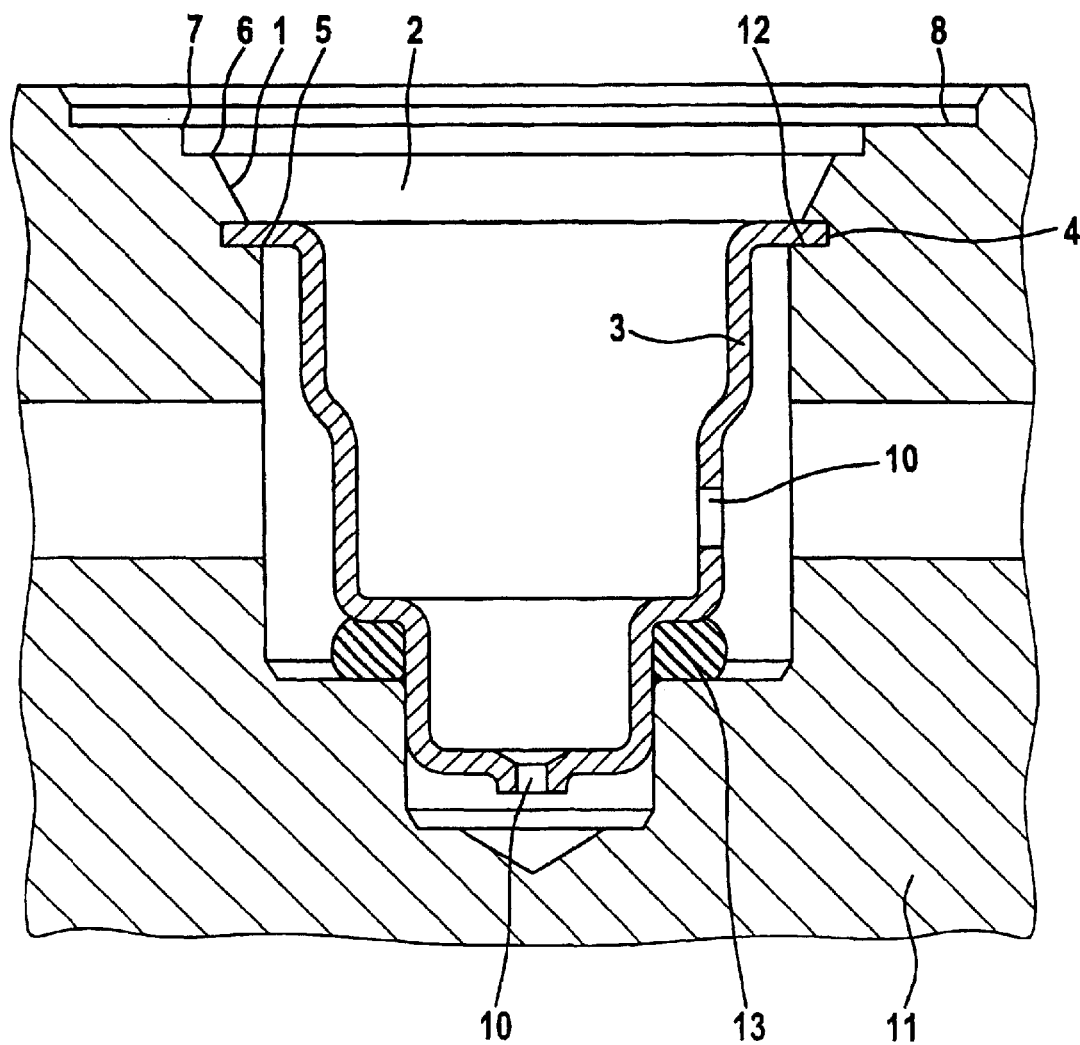
FIG. 1 is a view of a closure device with a bowl-shaped closure member calked in a housing.

FIG. 1 shows an enlarged cross-sectional view of part of a closure device (i.e. valve) for closing ducts that convey pressure medium in a valve-accommodating member, comprising a rotationally symmetric closure member 3 (valve seat) that is attached in an accommodating bore of a block-shaped housing 11. The periphery of the closure member 3 has a collar 4 that bears against a first housing step 5 in the accommodating bore 2. The material of the housing 11 that is softer compared to the material of the closure member 3 is deformed in the direction of the collar 4 to create a calked joint fixing the closure member 3 in the housing 11 in a fluid-tight and non-detachable manner. The present invention arranges for the calked joint to be configured as a calking cone 1 so that the accommodating bore 2 has a funnel-shaped contraction in the direction of the closure member 3, with a view to covering the periphery of the closure member 3 in the area of the collar 4 over a largest possible surface and, in addition, in a way so as to easily govern its mechanical tension. Succeeding the calking cone 1 upstream thereof is a second housing step 6 that is expanded in relation to the first housing step 5, said step 6 being formed by the housing material deforming plastically to become the funnel-shaped contraction of the accommodating bore 2. The second housing step 6 is bounded by a third housing step 7 whose end surface extending transversely to the axis of the accommodating bore 2 forms an end stop 8 for a calking punch 9. In order to take up the calking force, the closure member 3 abuts on a reaction surface 12 of the first housing step 5 that extends transversely to the bore axis. The reaction surface 12 is inclined by preferably 10 degrees in the direction of the bore axis before the calking process. This is advantageous because the eloxal coating of housing 11 composed of a light metal alloy may be cracked, with the result of a clean sealing edge despite spangles of the eloxal coating being produced. To accommodate components of an electromagnetic valve drive, the rotationally symmetric closure member 3 is configured as a valve sleeve which includes at its periphery transversely extending and at its bottom longitudinally extending valve inlet and valve outlet openings 10 that are preferably made by punching or embossing. Due to the chosen attachment according to the invention, advantageously, the closure member 3 may be manufactured at low cost by deep-drawing thin sheets. The collar 4 wedged between the closure member 3 and the housing 11 encompasses a sleeve end portion bent at right angles relative to the bore axis so that a relatively simple, inexpensive manufacture and attachment of the closure member 3 in the housing 11 is achieved.

Subsequently, the individual steps of the calking method are described by way of FIGS. 2a to 2d.

Figure 2A:
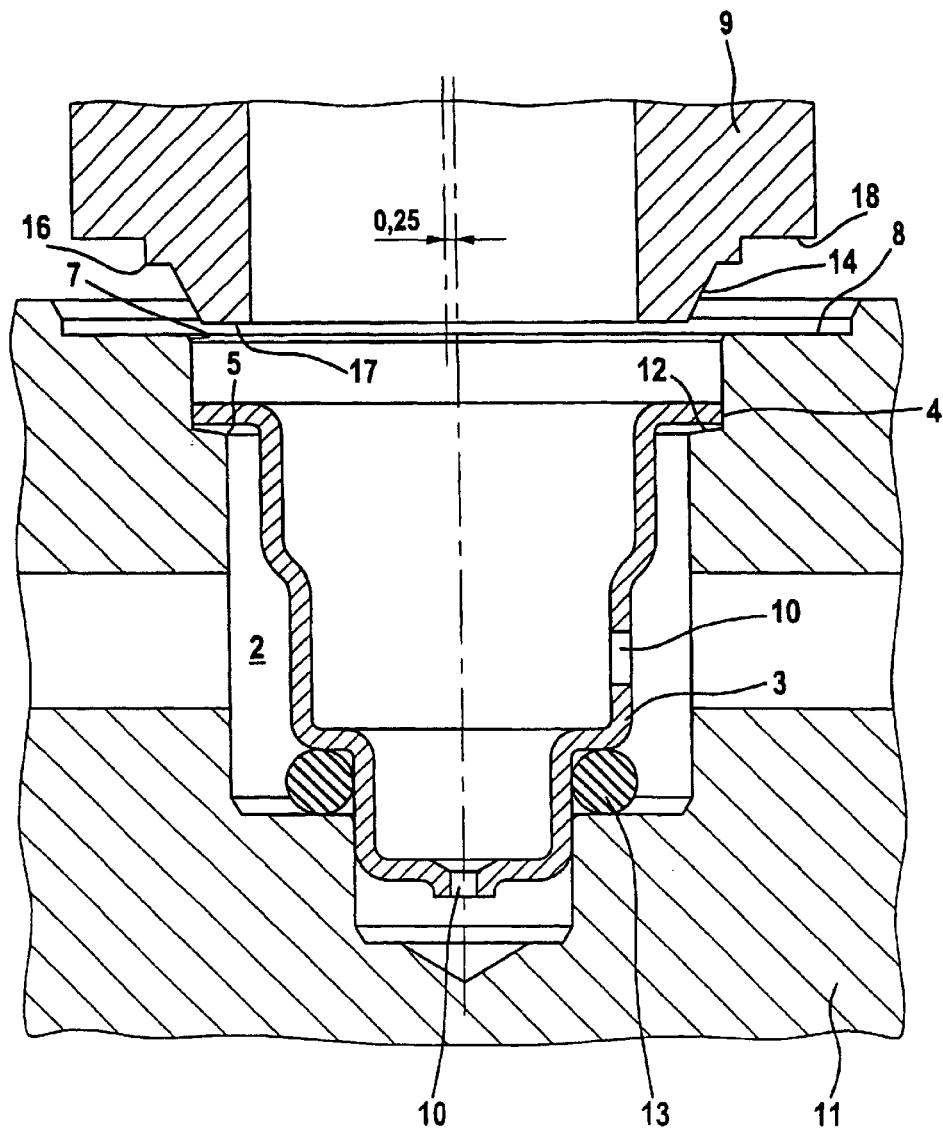
FIGS. 2a–2d show details with respect to the process of calking the closure member into an accommodating bore by means of a suitable calking punch.
Figure 2B:
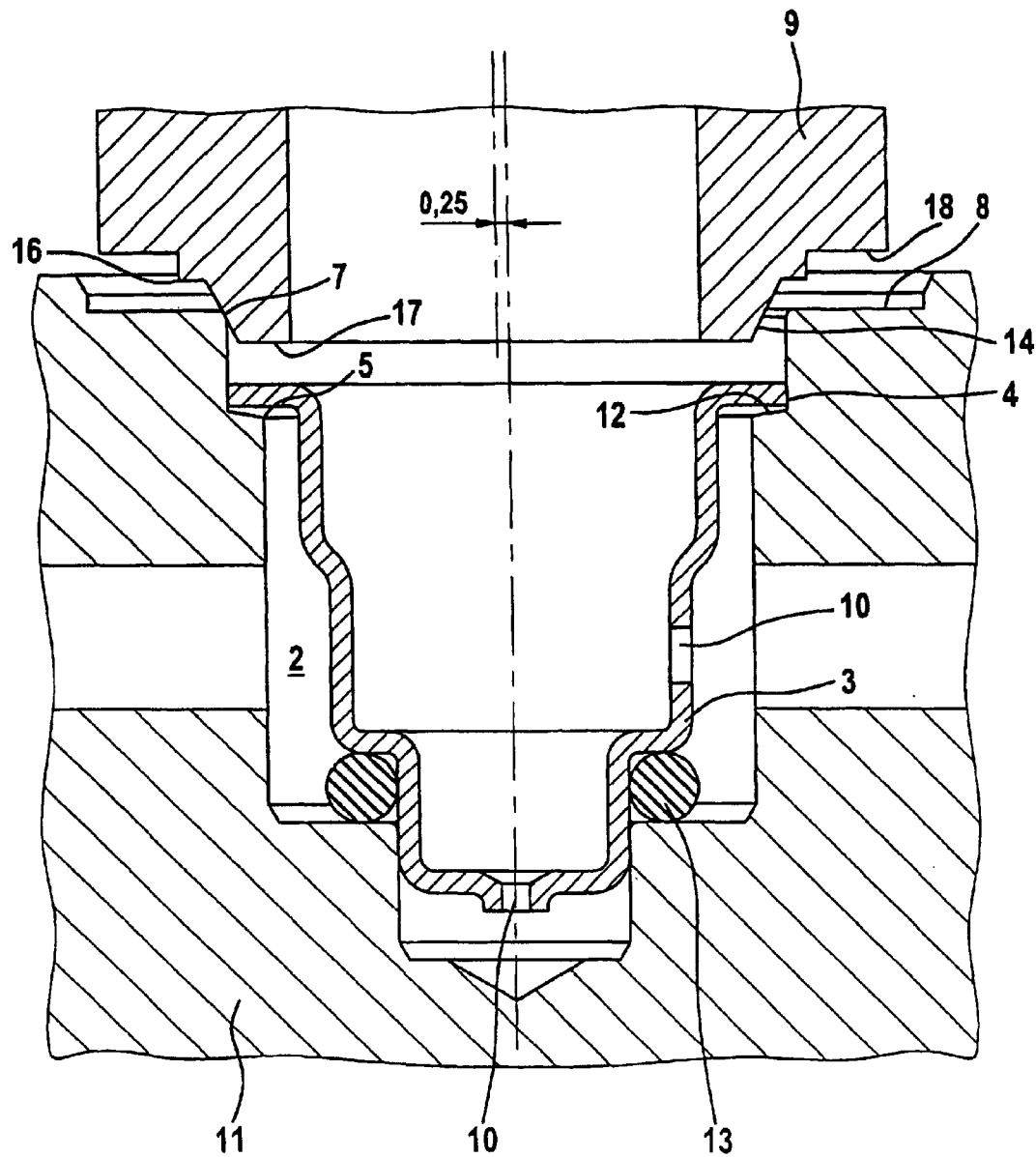

FIG. 2a shows in this respect a bowl-shaped closure member 3 inserted into the stepped accommodating bore 2, whose sleeve portion including an inlet opening 10 in the bowl bottom receives an O-ring 13 at a step, said O-ring being arranged between a bore step of the housing 11 and the shoulder of the closure member 3. Collar 4, which is remote herefrom and bent off in an outward direction at right angles relative to the bore axis, is initially supported with its edge above the conically inclined reaction surface 12 on the wall portion of housing 11 that will be deformed in the subsequent calking process in the direction of the calking cone 1. Consequently, it is easy to center the closure member 3 already after inserting it into the accommodating bore 2 in conformity with the demands of automation. Above the accommodating bore 2 there is already the calking punch 9 conveyed by the tool automaton, said punch—due to its geometry—centering itself automatically in relation to the accommodating bore 2.

Corresponding to said embodiment, the calking punch 9 when fed by the tool automaton initially has an axial offset of e.g. 0.25 mm in relation to the bore axis. According to FIG. 2b, this alignment error is automatically compensated by the one-side contact of the cone portion 14 on the third housing step 7 when lowering the calking punch 9 so that the cone portion 14 is of special importance for the further manufacturing process.

Figure 2C:
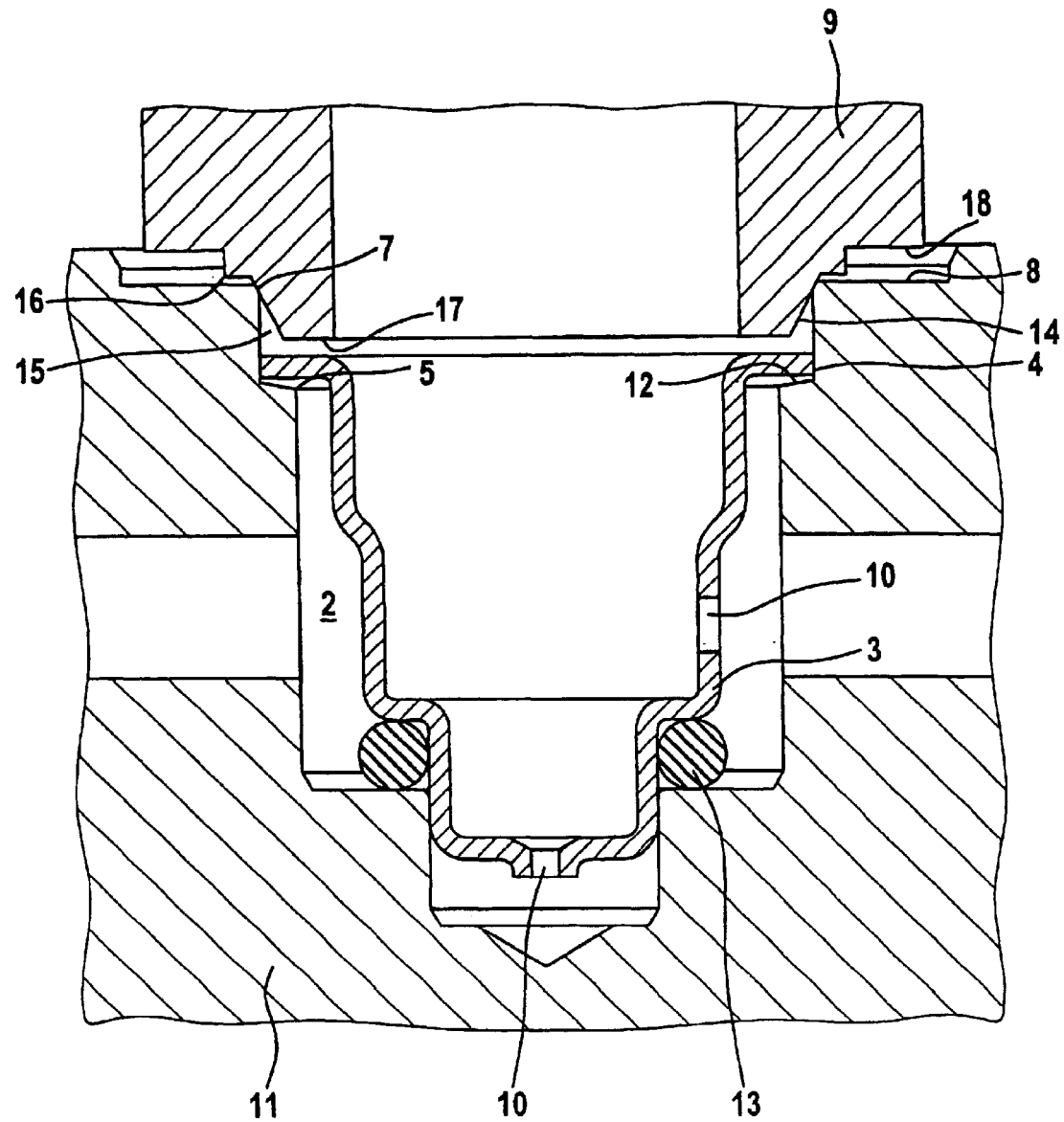

FIG. 2c shows already in this respect the centric alignment of the calking punch 9 at the third housing step 7. A floating or radial displaceability of the calking punch 9 in an appropriate tool feeding arrangement is consequently a precondition. Initially, the plastic deformation of the housing material in the direction of the free space 15 disposed between the cone portion 14 and the vertical wall portion of housing 11 commences only to a slight degree due to the calking force applied to the edge of the third housing step 7 by way of the cone portion 14, until the punch step 16 adjacent to the cone portion 14 moves to abut on the end surface of the end stop 8. Subsequently, under the continuous effect of the press-in force, the punch step 16 corresponding to its depth gauge enters vertically into the end surface of the end stop 8, with the housing volume displaced by the end surface in the direction of the calking punch 1 being at least twice as large as the receiving volume of the free space 15. It is achieved hereby that material volume of the housing 11 will not only displace into the free space 15 in the form of a housing projection onto the cone portion 14 but is additionally compressed in the direction of the collar 4 of the closure member 3. Consequently, a substantially radial compressive strain is produced in the deformation zone of the housing 11 during the vertical advance movement of the calking punch 9. Before the punch step 16 has reached its maximum immersion depth in the housing 11, the punch end surface 17 presses on the collar 4 of the closure member 3 plunging into the accommodating bore 2, with the collar 4 pressing into the inclined reaction surface 12 of the first housing step 5. This is advantageous because the eloxal coating of the light-metal housing 11 is cracked so that a clean sealing edge is achieved at the collar 4 despite spangles of the eloxal coating being produced. When the closure member 3 is immersed into the accommodating bore 2, the press-in force on the O-ring 13 will increase additionally, what enhances the sealing effect of the O-ring 13.

Figure 2D:
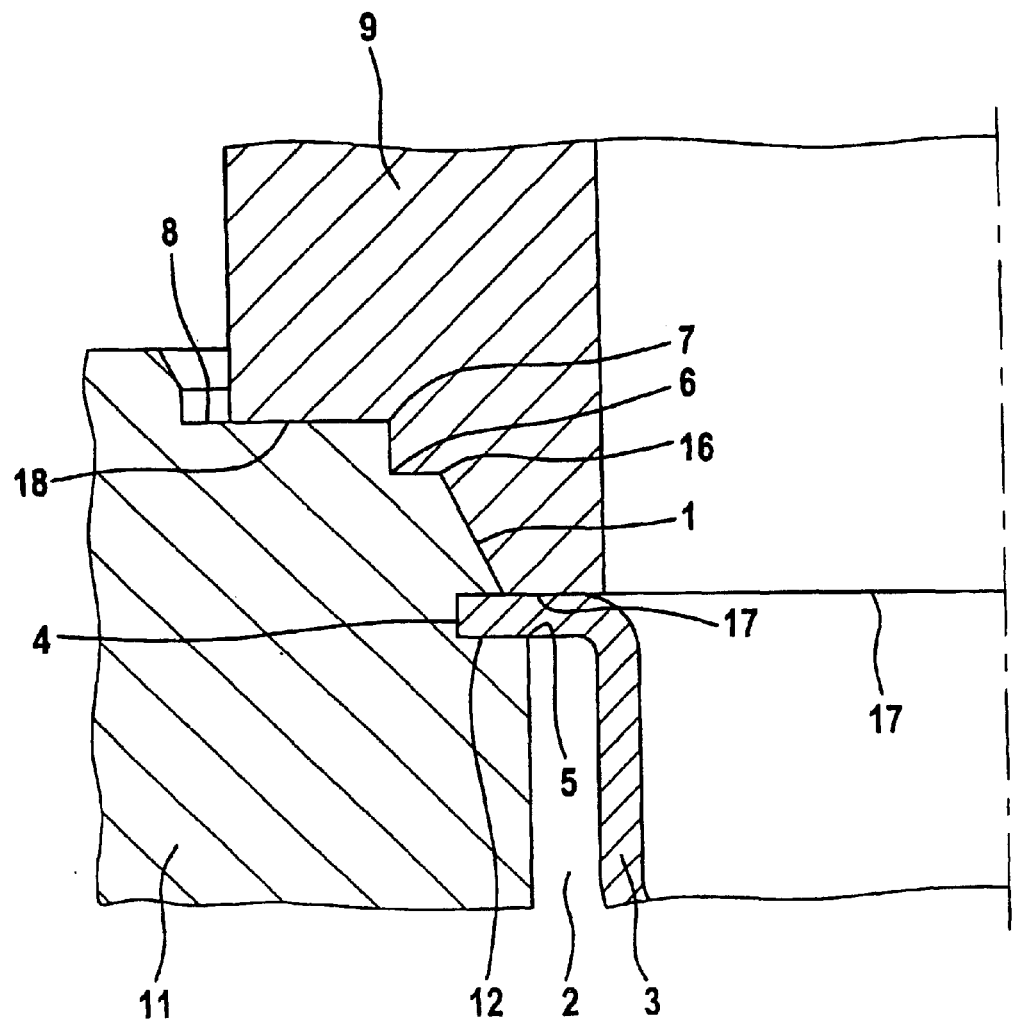

FIG. 2d shows the final position of the calking punch 9, in which the stop surface 18 that is adjacent to the punch step 16 is supported on the end stop 8 of the accommodating bore 2 so that further lowering of the closure member 3 into the accommodating bore 2 is prevented. As soon as the calking punch 9 is withdrawn from the accommodating bore 2, the material of the housing 11 compressed by the calking action is able to quasi spring back because the radially acting force component of the calking punch 9 is removed. The result is that a radially inwards directed reaction force acts upon the collar 4 of the closure member 3 and assists in sealing the closure member 3 in the area of the calked joint.

Further, it becomes apparent from FIG. 2d that the second housing step 6 known from FIG. 1 is produced only by the displacement effect of the punch step 16 so that the preparation of the accommodating bore 2 is limited exclusively to the simple manufacture of the first and third housing step 5, 7.

Without reference to the calking operation described hereinabove, under technical aspects, the closure member 3 can be attached in a pressure-fluid tight manner in the housing 11 in the fraction of a second in one single operation in a manufacturing sequence that is in conformity with the demands of automation.

List of Reference Numerals:

1 calking cone
2 accommodating bore
3 closure member (valve seat)
4 collar
5 first housing step
6 second housing step
7 third housing step
8 end stop
9 calking punch
10 inlet and outlet opening
11 housing
12 reaction surface
13 O-ring
14 cone portion
15 free space
16 punch step
17 punch end surface
18 stop surface

What is claimed is:
1. Valve seat assembly, comprising:
a housing including an accommodating bore,
a rotationally symmetric valve seat attached in said accommodating bore,
a calked joint provided at a periphery of the valve seat wherein said calked joint fixes the valve seat in the housing in a non-detachable manner, wherein the calked joint is configured with a funnel-shaped contraction narrowing in the direction of the valve seat, said contraction covering the periphery of the valve seat and said contraction acts directly on the periphery of the valve seat in the area of a collar of said valve seat, wherein said housing includes a second housing step that is expanded in relation to the first housing step wherein, said second housing step being formed by the housing material deforming plastically to become the funnel-shaped contraction of the accommodating bore.

2. Valve seat assembly as claimed in claim 1, wherein the second housing step is bounded by a third housing step whose end surface extends transversely to the axis of the accommodating bore forms an end stop for a calking punch.

3. Valve seat assembly as claimed in claim 1, wherein the valve seat abuts on a reaction surface of the first housing step that extends transversely to the accommodating bore axis.

4. Valve seat assembly as claimed in claim 3, wherein the reaction surface is inclined by 5 to 15 degrees in the direction of an axis of the accommodating bore axis.

5. Valve seat assembly as claimed in claim 1, wherein the valve seat is configured as a valve sleeve for accommodating components of an electromagnetic valve drive, the said valve seat including transversely and longitudinally extending inlet and outlet openings which are preferably formed by a punching or embossing operation.

6. Valve seat assembly as claimed in claim 1, wherein the valve seat is manufactured by deep-drawing sheet metal.

7. Valve seat assembly as claimed in claim 1, wherein a sealing surface is formed by plastically deforming housing material against a collar of said valve seat.

8. Method of attaching a valve seat in a housing, comprising the steps of:
locating a collar of a valve seat adjacent to a first step within an accommodating bore of a housing,
centering a calking punch at a third housing step at the accommodating bore disposed remote from the first housing step,
displacing housing material located between said first and third housing steps in the direction of said collar provided at the periphery of the valve seat,
displacing the housing material in the area of the accommodating bore to a second housing step by means of a punch step,
abutting of the calking punch on an end stop of the housing for terminating the feed movement of the calking punch in the direction of the valve seat.

9. Method as claimed in claim 8, wherein the valve seat is attached in the housing by means of the calking punch in one continuous operation.

10. Method as claimed in claim 8, wherein the calking punch is self-centering.

* * * * *